United States Patent [19]

Mann

[11] 3,906,392

[45] Sept. 16, 1975

[54] COMBINATION ELECTRON WINDOW-SUSTAINER ELECTRODE FOR ELECTRON BEAM DISCHARGE DEVICES

[75] Inventor: Michael M. Mann, Palos Verdes Estates, Calif.

[73] Assignee: Northrop Corporation, Los Angeles, Calif.

[22] Filed: Jan. 7, 1974

[21] Appl. No.: 431,353

[52] U.S. Cl. ............ 331/94.5 G; 330/4.3; 313/231; 331/94.5 PE
[51] Int. Cl.² ......................... H01S 3/22; H01S 3/07
[58] Field of Search .................... 313/231; 331/94.5; 330/4.3

[56] References Cited
OTHER PUBLICATIONS

Hunter, 1973, IEEE/OSA Conf. On Laser Eng. & Appl. Digest of Tech. Papers, No. 11.3, pp. 62–63, May 30–June 1, 1973.

*Primary Examiner*—Robert J. Webster
*Attorney, Agent, or Firm*—Edward A. Sokolski

[57] ABSTRACT

An integral sustainer electrode and electron beam window combination structure which is disposed across the window portion of an electron gun used in electron beam stabilized gas laser systems. The combination structure is non-reticulated and is located within a laser cavity to provide a relatively smooth non-reticulated wall which is substantially continuous with a wall of the laser cavity. In this way, supersonic flow streams of a laser gas can be introduced into the laser cavity in such manner as to minimize shock induced nonuniformities in the laser gas, and also to minimize electrode wave induced medium nonuniformities. A method of making the combination structure is also disclosed.

12 Claims, 6 Drawing Figures

COMBINATION ELECTRON WINDOW-SUSTAINER ELECTRODE FOR ELECTRON BEAM DISCHARGE DEVICES

BACKGROUND OF THE INVENTION

This invention relates in general to certain new and useful improvements in an apparatus which provides a controlled electron discharge in a gaseous medium, and which minimizes shock induced medium nonuniformities and electrode wave induced medium non-uniformities.

In one system used in the generation of laser beams (light amplification by stimulated emission of radiation), a primary electron beam stabilized electrical discharge is introduced into a laser gas by means of an electron gun, in the form of an electron accelerator. This primary electron beam impinges on the laser gas atoms to create ion pairs (secondary electrons). Furthermore, in this system of producing laser beams, a pair of sustainer electrodes, such as a sustainer anode and a sustainer cathode, may be located within the laser gas stream and are energized to create a sustainer electric field which excites the secondary electrons. These excited secondary electrons, in turn, excite or "pump" the laser gas molecules to generate the laser beam.

The above described system is relatively effective when the laser gas flow is within the subsonic flow range. The sustainer anode and cathode electrodes, which are generally foramenous grid structures, do not interfere with the gas flow in this flow range. Consequently, in low gas flows, the sustainer electrodes, which are located in the gas stream, do not appreciably interfere with the generation of the laser beam.

While the above described system is effective to produce a laser with low gas flow rates, this system is relatively ineffective at high gas flow rates. These grid structure sustainer electrodes substantially interfere with smooth gas flow particularly when the gas flows exist in the supersonic range. It has been found that shock induced nonuniformities are generated in the laser gas as a result of the gas impingement on the electrodes which are disposed within the gas flow stream. There have been attempts to recess the electrodes in the wall of the laser cavity to reduce this shock induced nonuniformity. However, in these attempts, the sustainer electrode, such as the sustainer cathode is spaced from the window structure of the electron gun which creates a stagnation space leading to the generation of other medium disturbances which interferes with the laser. Hence, these attempts have been relatively ineffective.

It has also been found that cathode waves are generated within the gas flow stream which introduces density disturbances in the gas, and which propagate across the entire region existing between the two electrodes. These cathode waves result from an nonuniform energy deposition in the high field region near the cathode, often referred to as a "cathode fall." This cathode fall always exists to some extent and will vary inversely with the cathode area. This cathode fall, which is undesirable, will increase and possibly become excessive as the cathode current density increases. In order to reduce this cathode fall, there have been several attempts to maximize the cathode area in order to properly handle the substantial amount of energy. However, by increasing the cathode area, it has been found that gas flow disturbance is increased, which again increases shock induced nonuniformities.

The present invention minimizes these and other problems by integrally incorporating a sustainer cathode or sustainer anode with the foil window on the electron gun. Furthermore, this structure is non-reticulated and provides a continuous smooth wall with the laser cavity so that shock induced non-uniformities or electrode wave induced medium nonuniformities are minimized.

It is therefore the primary object of the present invention to provide an electron beam stabilized electrical discharge gas laser system which minimizes shock induced medium nonuniformities and electrode wave induced medium nonuniformities.

It is another object of the present invention to provide an electron beam stabilized electrical discharge gas laser system of the type stated which combines the foil window of the electron gun with one of the sustainer electrodes.

It is a further object of the present invention to provide an improvement in electron beam stabilized gas laser systems which improvement resides in the integral combination of a sustainer electrode and electron screen window combination structure to be used with the electron gun.

It is also an object of the present invention to provide an electron beam stabilized electrical discharge gas laser system of the type stated which can be constructed at a relatively low cost and which is highly efficient in its operation.

It is another salient object of the present invention to provide a method of making a combination sustainer electrode and electron stream window combination structure which is highly efficient and relatively safe in use.

It is an additional object of the present invention to provide an electron beam stabilized electrical discharge gas laser system of the type stated which can be used with wide variety of laser gases and which can also be used at widely varying flow rates to produce a highly efficient laser.

With the above and other objects in view, my invention resides in the novel features of form, construction, arrangement and combination of parts presently described and pointed out in the claims.

GENERAL DESCRIPTION

The present invention can be described in general terms as an electron beam-stabilized electrical discharge gas laser system which is capable of substantially reducing shock induced medium nonuniformities and electrode wave induced medium non-uniformities. This gas laser system would comprise a vessel forming an internal laser cavity. Means is provided for introducing a laser gas under pressure into the cavity. Electron accelerator means is operatively associated with the vessel for introducing a high energy primary electron beam into the laser cavity. An integral non-reticulated first sustainer electrode and electron stream window combination structure is located across the portion of the accelerating means which is in operative communication with the laser cavity. A second electrode is spaced from the aforesaid combination structure and cooperates therewith to establish a sustainer electron field thereacross.

The electron beam-stabilized electrical discharge gas laser system of the present invention can be characterized in further detail in that the above described combination structure is located within the laser cavity to provide a smooth non-reticulated wall. Furthermore, this combination structure is fabricated as a unitary member. In a further aspect of the electron beamstabilized electrical discharge gas laser system, a support means is operatively associated with the electron accelerating means and the vessel. The combination structure is than rigidly secured, and preferably is brazed, to this support means to provide a relatively smooth non-reticulated wall substantially continuous with a wall of the vessel forming the laser cavity.

In a preferred embodiment of the present invention, the above described support means includes a plurality of spaced apart support elements. The combination structure is rigidly secured to substantially all of the support elements to provide a window permitting passage of electrons in the high energy primary electron stream and to also function as a sustainer electrode. Further, means is provided for masking to sustainer field electron flow, certain portions of said combination structure which are not secured to said support elements. This support means comprises a rectangularly shaped frame member with a plurality of spaced apart substantially parallel support elements extending across the frame member. The non-masked areas of the combination structure are electron conductive areas, which are rigidly secured to the frame member and the spaced apart substantially parallel support elements. The support frame is then disposed over an open end of the electron accelerating means and is sealed thereto with an electrically conductive sealing ring.

The present invention can also be described in general terms as an improvement in electron beam stabilized gas laser devices of the type which use an electron gun for generating a high energy primary electron beam across a laser gas contained within a laser cavity. This improvement would comprise an integral first sustainer electrode and electron stream window combination structure across a portion of the electron gun in operative communication with the cavity. A second sustainer electrode is also spaced from the combination structure and cooperates therewith to establish a sustainer electron field thereacross.

The improvement in the electron beam stabilized gas laser device can also be characterized in further detail in that the combination structure is located within the laser cavity to provide a smooth non-reticulated wall. In a preferred aspect of the improvement in the laser devices, a support means is operatively associated with the electron gun. The combination structure is rigidly secured to this support means to provide a relatively smooth non-reticulated wall substantially continuous with a wall forming the laser cavity.

Again, this support means, as described above, is operatively associated with the electron gun and includes a plurality of spaced apart support elements. The combination structure is rigidly secured to, and preferably brazed to, substantially all of the support elements to provide a window permitting passage of electrons in the high energy primary electron stream and to also function as a sustainer electrode. Means is further provided for masking to sustainer field electron flow certain portions of the combination structure which are not secured to the support elements.

The present invention can also be described in general terms as a method of fabricating a foil sustainer electrode-window combination structure. This method comprises the locating of a mask having a plurality of spaced apart open portions over a foil sheet. A coating which is insulatively resistant to sustainer electron flow is then applied to the foil sheet through the open portions of the mask to thereby provide sustainer field electron conductive areas and sustainer field electron nonconductive areas. The foil sheet is then located on a support frame having a plurality of spaced apart support elements with open areas therebetween. In this way, the sustainer field electron conductive areas are generally registered with the support elements and the sustainer field electron nonconductive areas are disposed over the open areas of the support frame. Finally, the sustainer field electron conductive areas are rigidly secured to the support elements registered therewith.

The method of fabricating the foil sustainer electrode-window combination structure of the present invention can be characterized in further detail in that the sustainer field electron conductive areas are brazed to the support elements to provide such rigid securement.

In a preferred embodiment of the method, the support frame comprises a rectangularly shaped frame member with a plurality of spaced apart substantially parallel support elements extending across the frame member. The sustainer field electron conductive areas are rigidly secured to the frame member and to the spaced apart substantially parallel support elements. The support frame is disposed over the open end of an electron generating housing and is sealed thereto with an electrically conductive sealing ring.

BRIEF DESCRIPTION OF THE DRAWINGS

Figure 1:
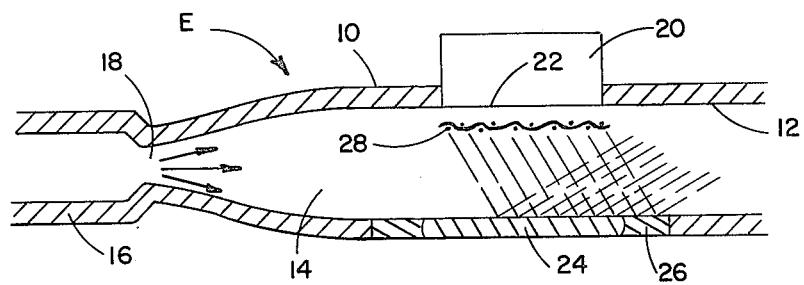
Figure 2:
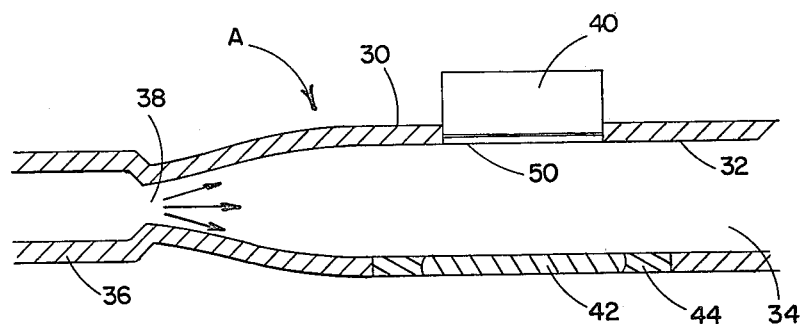
Figure 3:
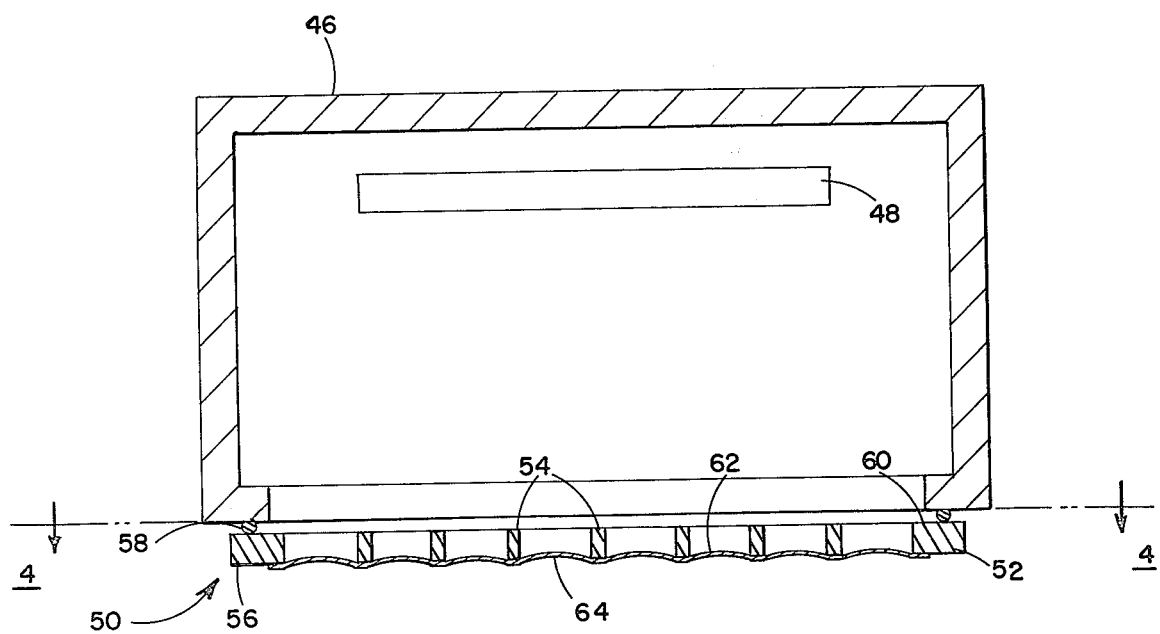
Figure 4:
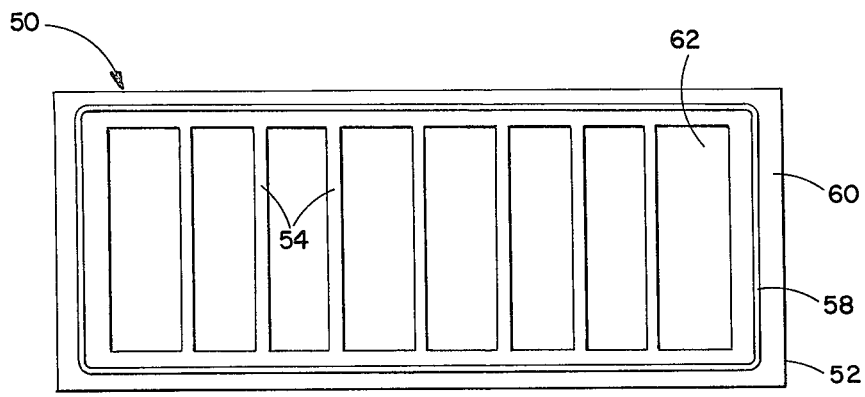
Figure 5:
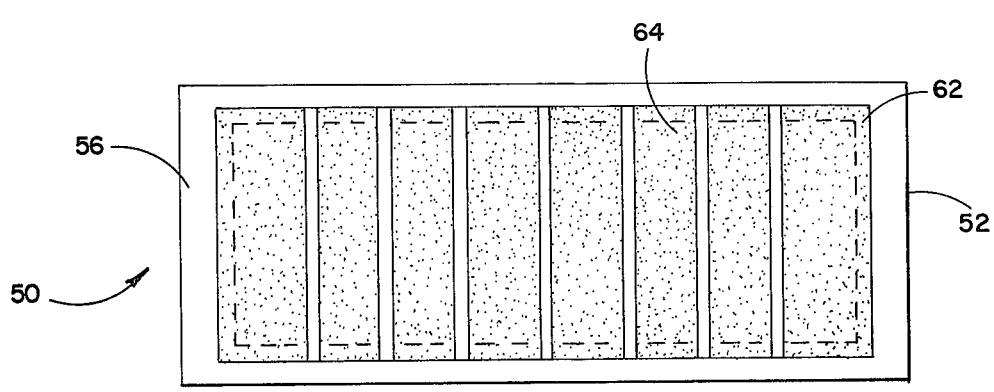

Having thus described the invention in general terms, referene will now be made to the accompanying drawings in which:

FIG. 1 is a vertical sectional view of a conventional (prior art) electron beam stabilized electrical discharge gas laser system;

FIG. 2 is a vertical sectional view, similar to FIG. 1, and showing an electron beam stabilized electrical discharge gas laser system constructed in accordance with and embodying the present invention;

FIG. 3 is a vertical sectional view of a combination sustainer electrode and electron screen window structure which is produced in accordance with and embodying the present invention;

FIG. 4 is a horizontal sectional view taken along line 4—4 of FIG. 3 and showing the upper portion of the structure of FIG. 3;

FIG. 5 is a bottom plan view of the structure illustrated in FIGS. 3 and 4; and

Figure 6:
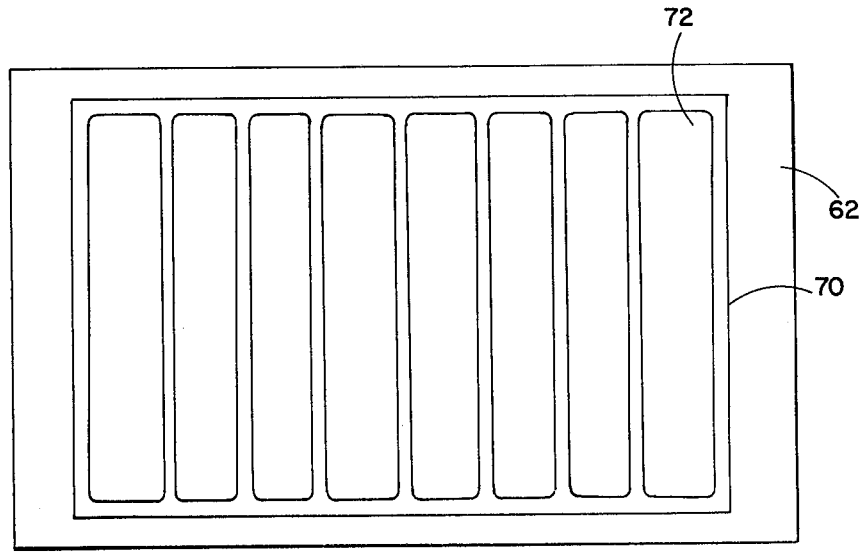

FIG. 6 is a top plan view of a mask which is used in the fabrication of the combination sustainer electrode and electron screen window structure.

DETAILED DESCRIPTION

Referring now in more detail and by reference characters to the drawings, FIG. 1 illustrates a conventional prior art conventional post-expansion excitation gas laser device E of the type which uses a pair of sustainer electrodes in combination with an electron gun. The gas laser device E is representative of the type of prior art gas laser system, which uses an electron beam stabilized electrical discharge between a pair of sustainer electrodes in contact with a gas stream. Thus, the sustainer electrodes serves to excite the secondary electrons thus formed and pump the molecules of the laser gas to create the laser beam.

The laser device E generally comprises a vessel 10 having an interior wall 12 forming a laser cavity 14. The vessel 10 is preferably made of an electrically conductive material, such as stainless steel, or the like, although the vessel 10 could be made of electrically non-conductive materials including many plastics, such as a polycarbonate plastic. In either case the vessel 10 should preferably be designed to withstand substantial temperature differentials. At its left-hand end, the interior wall is tapered inwardly and integrally merges into a supersonic gas expansion nozzle 16, permitting laser gas flow from an external source (not shown) through an orifice 18.

FItted within the wall of the vessel 10 is an electron gun 20 which is provided with a foil-type of electron window 22 disposed in smooth continuous relationship with the interior wall 12 of the vessel 10. Also fitted within the wall of the vessel 10 in a diametrally opposed position to the electron window 22 is a metallic sustainer anode 24 surrounded by a dielectric insulator 26. A sustainer cathode 28 is also located in closely disposed relationship to the foil electron window 22, which may be energized by the electron gun 20. The sustainer cathode 28 operates in conjunction with the anode 24, to establish an electron stream in the form of a sustainer electron field thereacross in the path of the laser gas flow.

The laser device E would also be provided with a proper discharge end on the vessel 10 including suitable evacuating equipment and the like (not shown). The laser device E would also be suitable provided with mirrors and other structure normally found on laser devices of this type which is necessary to generate a proper laser beam.

in the above described system, it can be observed that while the sustainer electrodes 24 and 28 create a sustainer electron field therebetween, the sustainer cathode 28 is located within the gas stream. This sustainer cathode 28 is generally formed of a foramenous or screen-like metallic material, but nevertheless interferes with normal gas flow, particularly at supersonic flow ranges. This interference with gas flow has been found to generate various shock waves of the type described above and substantially interferes with proper laser generation.

FIG. 2 illustrates an electron beam sustained electrical discharge gas laser device A, which is similar in some respects to the laser device E described above. The laser device A also comprises a vessel 30 having an interior wall 32 forming a laser cavity or so-called "laser chamber" 34. The vessel 30 would normally be formed of the same material used in and with the same thickness as the vessel 10. The interior wall 32 is again tapered inwardly at its left-hand end, and integrally merges into a supersonic gas expansion nozzle 36, which permits laser gas flow from an external source (not shown) at supersonic flow ranges through an orifice 38.

An electron gun or so-called "electron accelerator" 40 is mounted within the wall of the vessel 30, and communicates with the laser chamber 34 in the manner to be hereinafter described in more detail. In addition, a sustainer anode 42 is also mounted within the wall of the vessel 30 in a diametrally opposed position to the electron gun 40. The sustainer anode 42 is further retained in a dielectric insulator 44, in the manner as illustrated in FIG. 2 of the drawings. The sustainer anode 42 will also operate with a form of sustainer cathode, to be hereinafter described in more detail, to establish a sustainer electron field thereacross in the path of the laser gas flow.

The electron gun 40 comprises an electrically conductive rectangularly shaped enclosure 46 preferably constructed of stainless steel or like material, and which is initially open at its lower end, in the manner as illustrated in FIG. 3 of the drawings. The electrons are generated in a conventional manner, as for example, by thermionic emission from a plurality of spaced filaments (not shown) and which are supported within the enclosure 46. In addition, the enclosure 46 will include an electron gun anode (not shown) and a reticulated electron gun cathode 48. However, it should be understood that the electrons in the high energy primary electron stream could be generated by other means known in the art, as for example, by field emission or cold cathode emission.

A conventional pulse circuit (not shown) may also be coupled to the electron generating source within the enclosure 46 to provide the necessary potential, and to control the amount of high energy electrons in the primary field released by the electron gun 40. The elelctron gun 40 will generally provide an abundance of high energy electrons, which are effective to form electron-ion pairs from the atoms of the laser gas.

An integral non-reticulated sustainer cathode and electron stream window combination structure 50 is disposed over the open end of the enclosure 46, in the manner as illustrated in FIGS. 2 and 3 of the drawings. This sustainer electrode-window combination structure 50 is more fully illustrated in FIGS. 4 and 5 of the drawings, and is described in more detail hereinafter. In accordance with the present invention, however, the sustainer cathode and sustainer anode could be reversed so that the sustainer cathode assumes the position of the anode 42. In this case, the structure 50 would be a non-reticulated sustainer anode and electron stream window combination.

In this case, the electron gun 40 will generate a high energy primary electron beam for generating secondary electrons from the laser gas upon impingement with the laser gas atoms. The sustainer electron field will excite these secondary electrons to thereby pump the molecules of the laser gas. In this way the laser beam is thus generated.

As used herein, the term "laser gas" refers to a particular gas which contains the necessary constituents to generate a laser beam. Some of these gases include, for example, carbon monoxide, carbon dioxide, hydrogen chloride, hydrogen fluoride and the like. Many of these gases are typically mixed with diluents, and in the case of carbon monoxide, diluents such as nitrogen, argon, or helium may be used. Furthermore, many of the low temperature gases, as for example, carbon monoxide, may be maintained at relatively low temperatures, typically, 80° Kelvin to 100° Kelvin at 1 atmosphere of pressure. The laser action in these gases normally occurs due to transitions between the energy states in the gas. The transition between neighboring vibrational levels in carbon monoxide would produce a laser action. This energy for the upper state can be obtained by collision with the diluents such as the nitrogen molecules, or by direct electron excitation.

The combination sustainer cathode-window structure 50 generally comprises a rectangularly shaped electrically conductive frame 52 which is preferably formed of an electrically conductive metal, such as stainless steel or the like. The frame 52 is provided with a plurality of spaced apart transversely extending generally parallel support arms 54. By reference to FIGS. 3 and 5 of the drawings, it can be observed that the lower planar faces of the support arms 54 are coplanar with each other and coplanar with a lower planer face 56 of the frame 52.

A rectangularly shaped metallic and electrically conductive sealing ring 58 is formed or otherwise located within an upwardly presented face 60 of the frame 52 for abutment against the lower portion of the metallic enclosure 46, in the manner as illustrated in FIG. 3 of the drawings. Alternatively, it should be recognized that the sealing ring 58 could be located within the lower face of the metallic enclosure 46 for sealing engagement with the upwardly presented face 60 of the frame 52. The annular sealing ring 58 is preferably formed of crushed copper or gold or similar electrically conductive material.

The conventional elastomeric seals are generally less advantageous in the present invention due to the fact that these elastomeric seals are not electrically conductive. Furthermore, in many cases, these elastomeric seals are not capable of withstanding the high temperatures achieved during operation of the laser device. However, it is possible to modify the elastomeric seals, if necessary, to make them electrically conductive and sufficiently heat resistant.

A combination window-sustainer cathode plate 62 is disposed over the lower face 56 of the rectangularly shaped frame 52 and is rigidly secured thereto and to the various support arms 54. The plate 62 is preferably formed of an aluminum foil and generally the plate foil plate 62 is secured to the frame 52 by continuous brazing along its entire periphery so as to maintain a vacuum within the electron gun 40. However, other materials could be employed in the fabrication of the plate 62. Thus, for example, various aluminum allys, titanium, beryllium, stainless steel, and other forms of electrically conductive metal which can be formed in relatively thin foil sheets may be used.

The present invention is not limited to the brazing of the foil sheet and different forms of securing the sheet to the support frame 52 may be employed. For example, gold diffusion bonding or continuous welding could be used in place of brazing. The exact means of securement will primarily depend upon the material used in the fabrication of the plate 62.

The window-sustainer cathode plate 62 should preferably be formed of a relatively thin material in order to avoid heat generation and electron scattering problems. The foil sheet used in the making of the plate 62 should have a minimum overall thickness of about 0.10 mils and a maximum overall thickness of about 5.0 mils. Preferably, however, the foil sheet should have a minimum overall thickness of about 0.50 mils and a preferable maximum overall thickness of about 2.0 mils.

The window-sustainer cathode plate 62 is also provided with a series of masked areas 64 which are effective to prevent sustainer field electron flow through the plate 62 at these masked areas 64. However, the high energy electrons in the primary electron beam will pass through the masked areas 64 and into the laser cavity 34. By further reference to FIG. 5 of the drawings, it can be observed that the masked areas 64 are located between the various support arms 54 on the frame 52. it can also be observed, by reference to FIG. 5, that substantially all of the area existing between the longitudinally disposed legs of the support frame 52 and the transversely extending arms 54 is masked to sustainer field electron flow so that the only open or unmasked areas on the plate 62 lie in registry with the transversely extending arms 54. This masking can be accomplished by anodizing, or otherwise the masking can be accomplished by application of an external coating to the foil sheet plate 62 prior to securement to the frame 52.

The masked areas on the foil sheet plate 62 may be created by means of a mask form 70 which is more fully illustrated in FIG. 6 of the drawings. This mask form 70 would normally be used in the making of the plate 62 prior to securement to the frame 50 and the coating or mask would then be applied to the foil sheet through open areas 72 in the mask form 70. In this case, the mask form 70 has a configuration similar to the frame 52, so that the mask form 70 presents the open areas 72 in regions corresponding to the masked portions 64 on the plate 62. However, it should be recognized that other forms of creating the masked areas 64 could also be employed.

This type of structure has been found to be highly effective in that the sustainer field electron flow occurs through the window-sustainer cathode plate 60 only at the support arms 54. Due to the relatively thin construction of the foil sheet 60, the foil normally has a very low heat capacity. The arms 54 function as a form of heat sink and consequently, with sustainer field electron flow occurring through the foil sheet only along the regions of the support arms 54, thermal damage to the foil sheet due to the sustainer field current is thereby eliminated. In this way, it is possible to obtain high thermal dissipation capability when sustainer field current flow is restricted to the point where the foil sheet is disposed in engagement with the heat-sink-functioning support arms 54. Nevertheless, this structure is sufficient to permit passage of electrons in the primary electron beam without damage to the foil sheet. Furthermore, by means of this construction, it can be observed that it is not necessary to use a foramenous type sustainer cathode, since the foil sheet can still be sufficiently thin so as to be electron transparent to electrons in the primary beam.

Further, it should be observed in connection with the present invention that while the window structure 50 has been described as a cathode windoe structure, this structure could be an anode window structure. Thus, the anode and cathode would be interchanged in accordance with the present invention.

The non-reticulated sustainer cathode and electron stream window combination structure 50 is located within the plasma chamber 34 so that the window-sustainer cathode plate 62 is essentially flush with the interior wall 32, and in effect, continuous with the wall 32. In this way, the structure 50 does not create any form of laser gas flow interference. Furthermore, it can be observed that by means of the above outlined construction, the window and sustainer cathode, normally present as separate components in various prior art systems, have been combined as an integral unit. This combination thereby reduces the problem of foil failure, the normal problems of window failure, and also minimizes cathode caused flow disturbances.

Thus, there have been illustrated and described a novel combination electron window-sustainer electrode structures for electron beam discharge devices and laser systems utilizing same, as well as a method of making these structures, and which fulfill all of the objects and advantages sought therefore. Many changes, modifications, variations and other uses and applications of the window electrode structures and the method of making such structures and the laser systems will become apparent to those skilled in the art after considering this specification and the accompanying drawings. Therefore, all such changes, modifications, variations and other uses and applications which do not depart from the spirit and scope of the invention are deemed to be covered by the invention which is limited only by the following claims.

Having thus described my invention, what I desire to claim and secure by letters patent is:

1. An electron beam stabilized electrical discharge gas laser comprising a vessel, means for introducing a laser gas under pressure into saiad vessel, electron accelerator means supported on said vessel for introducing a higher energy primary electron beam into said vessel, an integral first sustainer electrode and electron stream window combination structure located in the path of the electron beam of said accelerating means, said structure being positioned out of the main laser gas stream so as to minimize interference thereby with laser gas flow, and a second sustainer electrode spaced from said combination structure and cooperating therewith to establish a sustainer field electron stream thereacross.

2. The electron beam stabilized electrical discharge gas laser system of claim 1 further characterized in that said combination structure is located within said cavity to provide a smooth wall in said cavity.

3. The electron beam stabilized electrical discharge gas laser system of claim 1 further characterized in that said structure is a unitary member.

4. The electron beam stabilized electrical discharge gas laser system of claim 1 further characterized in that support means is operatively associated with said electron accelerating means and said vessel, and that said combination structure is rigidly secured to said support means to provide a relatively smooth non-reticulated wall substantially continuous with a wall of said vessel forming the laser cavity.

5. The electron beam stabilized electrical discharge gas laser system of claim 1 further characterized in that support means is operatively associated with said electron accelerating means and said vessel, and that said combination structure is brazed to said support means to provide a relatively smooth nonreticulated wall substantially continuous with a wall of said vessel forming the laser cavity.

6. The electron beam stabilized electrical discharge gas laser system of claim 1 further characterized in that support means is operatively associated with said electron accelerating means and includes a plurality of spaced apart support elements, said structure being rigidly secured to substantially all of said support elements to provide a window permitting passage of electrons, and to function as an electrode, and means for masking to electron flow from the sustainer field electron stream certain portions of said combination structure which are not secured to said support elements.

7. The electron beam stabilized electrical discharge gas laser system of claim 1 further characterized in that said support means comprises a rectangularly shaped frame member with a plurality of spaced apart substantially parallel support elements extending across said frame member, and that the nonmasked areas of said combination structure are rigidly secured to said frame member and the spaced apart substantially parallel support elements and are conductive to sustainer field electron flow.

8. The electron beam stabilized electrical discharge gas laser system of claim 7 further characterized in that said support frame is disposed over an open end of said electron accelerating means and is sealed thereto with an electrically conductive sealing ring.

9. An improvement in an electron beam stabilized gas laser device which uses an electron gun for generating a high energy primary electron beam across a laser gas contained within a laser cavity; the improvement comprising an integral first sustainer electrode and electron stream window combination structure positioned in the path of said electron beam and forming a window between the gun and the cavity, said structure being located out of the main laser gas stream so as to minimize interference thereby with laser gas flow, and a second sustainer electrode spaced from said structure and cooperating therewith to establish a sustainer electron field thereacross.

10. The improvement in the electron beam stabilized gas laser device of claim 9 further characterized in that said combination structure is located within said cavity to form a smooth non-reticulated wall of said cavity.

11. The improvement in electron beam stabilized gas laser device of claim 9 further characterized in that support means is operatively associated with said electron gum and the said combination structure is rigidly secured to support means to provide a relatively smooth non-reticulated wall substantially continuous with a wall forming the laser cavity.

12. The improvement in electron beam stabilized gas laser device of claim 9 further characterized in that support means is operatively associated with said electron gun and includes a plurality of spaced apart support elements, said structure being rigidly secured to substantially all of said support elements to provide a window permitting passage of electrons in the sustainer electron field and to function as an electrode, and means for masking to electron flow in the sustainer electron field certain portions of said combination structure which are not secured to said support elements.

\* \* \* \* \*